United States Patent [19]

Olivier

[11] 4,320,381
[45] Mar. 16, 1982

[54] GEAR RATIO INDICATOR

[75] Inventor: Paul D. Olivier, Scottsdale, Ariz.

[73] Assignee: The Garrett Corporation, Los Angeles, Calif.

[21] Appl. No.: 63,212

[22] Filed: Aug. 3, 1979

[51] Int. Cl.³ .......................... G09B 9/04; G08B 21/00
[52] U.S. Cl. .............................. 340/52 F; 324/140 D; 340/870.06; 434/71
[58] Field of Search ................ 340/179, 52 R, 52 F, 340/54; 324/140 D, 161; 35/11 R; 116/233

[56] References Cited

U.S. PATENT DOCUMENTS

| | | |
|---|---|---|
| 2,248,504 | 7/1941 | Kenny . |
| 2,375,654 | 5/1945 | Howell . |
| 2,751,580 | 6/1956 | Stump . |
| 2,915,703 | 12/1959 | Kessler . |
| 2,977,536 | 3/1961 | Hindel . |
| 3,040,983 | 6/1962 | Bigelow . |
| 3,096,590 | 7/1963 | Stepanek . |
| 3,197,137 | 7/1965 | Watson . |
| 3,296,607 | 1/1967 | Pasinski . |
| 3,363,455 | 1/1968 | Vanderbilt, Jr. . |
| 3,462,607 | 8/1969 | Heinz . |
| 3,574,947 | 4/1971 | Stepanek et al. . |
| 3,809,956 | 5/1974 | Burkel et al. ......................... 324/161 |
| 3,896,564 | 7/1975 | Dewey et al. ......................... 35/11 R |
| 3,947,814 | 3/1976 | Allen . |
| 4,025,897 | 5/1977 | Kisuna et al. . |
| 4,150,497 | 4/1979 | Weber ................................. 340/52 F |

*Primary Examiner*—Thomas A. Robinson
*Attorney, Agent, or Firm*—James W. McFarland; Albert J. Miller

[57] ABSTRACT

For use in combination with "crash type" non-synchronous gear boxes, a gear ratio indicator which not only calculates actual ratio of transmission input shaft speed to output shaft speed, but also compares this determined ratio to the various available gear ratios within the transmission. The actual or determined ratio of input to output speed is then displayed in terms of the available gear ratios so that the operator is provided information as to the precise moment for engaging the transmission and also information as to which gear to engage.

21 Claims, 2 Drawing Figures

GEAR RATIO INDICATOR

BACKGROUND OF THE INVENTION

This invention relates to display devices useful in conjunction with non-synchronous, crash type transmission gear boxes such as commonly utilized in the trucking industry. More particularly, this invention relates to a gear ratio indicator which advises the vehicle operator when to shift gears and also advises as to which gear ratio can be selected at any given moment.

For reasons of cost and fuel economy, it is common practice within the heavy trucking industry to utilize manual, "crash type", non-synchronized gear boxes for transmissions. This is preferred by trucking operators for a variety of reasons, it being noted that auomatic transmissions as utilized in automobiles present too great of an initial cost for large trucks which often times have fifteen or more different gear ratios. Similarly, synchronized type manual transmissions are also preferred in heavy-duty trucks because of the costs, complexity, and reduced reliablity in attempting to incorporate synchronous mechanisms for each of the fifteen or more gear ratios.

A continual problem during operation of such trucks equipped with a conventional, non-synchronous, multispeed transmission has been the ability to engage the transmission at the proper time and into the proper gear ratio. "Double clutching" is normally required when shifting gears in such a large transmission. More particularly, this includes depressing the clutch pedal once in order to shift the transmission to neutral and disengage the transmission input and output shafts. Then upon moving the transmission to the next gear, the clutch pedal is again depressed whenever the transmission input shaft has reached the appropriate speed in comparison to transmission output speed. Intermediate to the two clutching operations, the transmission input shaft is interconnected to the engine drive shaft so that the engine operator can determine, by experience, through sound of the engine, approximately what the transmission input shaft speed is. Simply by long experience the driver learns to compare the noises of the engine and his knowledge of his ground speed to mentally know when to complete the shift into another gear ratio, and to know what gear ratio to shift into. A traditional tachometer is also helpful to the operator, but only so long as there is no significant change in vehicle speed and normal engine operating range.

This problem becomes doubly difficult in the event that a shift is "missed", or due to traffic conditions the engine is taken out of its normal operating ranges. In such instances the vehicle speed changes sufficiently so that it becomes yet more difficult to know when to engage the transmission and to know which of up to fifteen gear ratios to select at any given moment.

Accordingly, it would be desirable to provide information to the operator precisely indicating when the ratio of transmission input speed to output speed equals a certain gear ratio available in the transmission, so that he may know precisely when to shift, and what gear ratio to shift to.

SUMMARY OF THE INVENTION

Accordingly, it is a broad object of the present invention to provide method and apparatus for displaying information useful to an operator shifting a non-synchronized, multispeed, manual type transmission.

More particularly, an object of the present invention is to provide improved method and apparatus for displaying the determined ratio of transmission input speed to output speed in terms of the selectively available gear ratios within the transmission so that the operator may know when to engage the gears and complete the shifting operation, and may also known what gear ratio to select at any given moment.

In summary, one form of the invention includes method and apparatus for sensing the transmission input and output speeds, and then calculating and determining the actual ratio of input speed to output speed at all conditions of transmission operation. This determined ratio is then displayed in operator understandable language as a function of the different gear ratios available. For instance, the determined ratio is fed to an analog signal readout device having indicia thereon corresponding to the rear ratios available. In one arrangement this analog indicator provides an analog readout with the whole numbers thereof corresponding to different gear ratios available. This is a continuous readout device so that the operator can glance at the readout at any given moment and know what the actual transmission input to output ratio speeds are in comparison to the available ratios within the transmission. In another arrangement, the two speed signals are transformed to digital inputs to a micro-processor unit and fed to a digital readout device where, again, whole numbers equal different ones of the selectively available gear ratios within the transmission. At the same time, fractional or decimal numbers tell the operator that his actual operating transmission ratio speed is intermediate of the gear ratios available within the transmission, and that either ground speed or transmission input speed must be adjusted to match it to an available gear ratio.

These and other objects and advantages of the invention are specifically set forth in or will become apparent from the following detailed description of preferred forms of the invention when read in conjunction with the accompanying drawing.

DETAILED DESCRIPTION OF THE DRAWING

DETAILED DESCRIPTION OF THE PREFERRED EMBODIMENT

Figure 1:
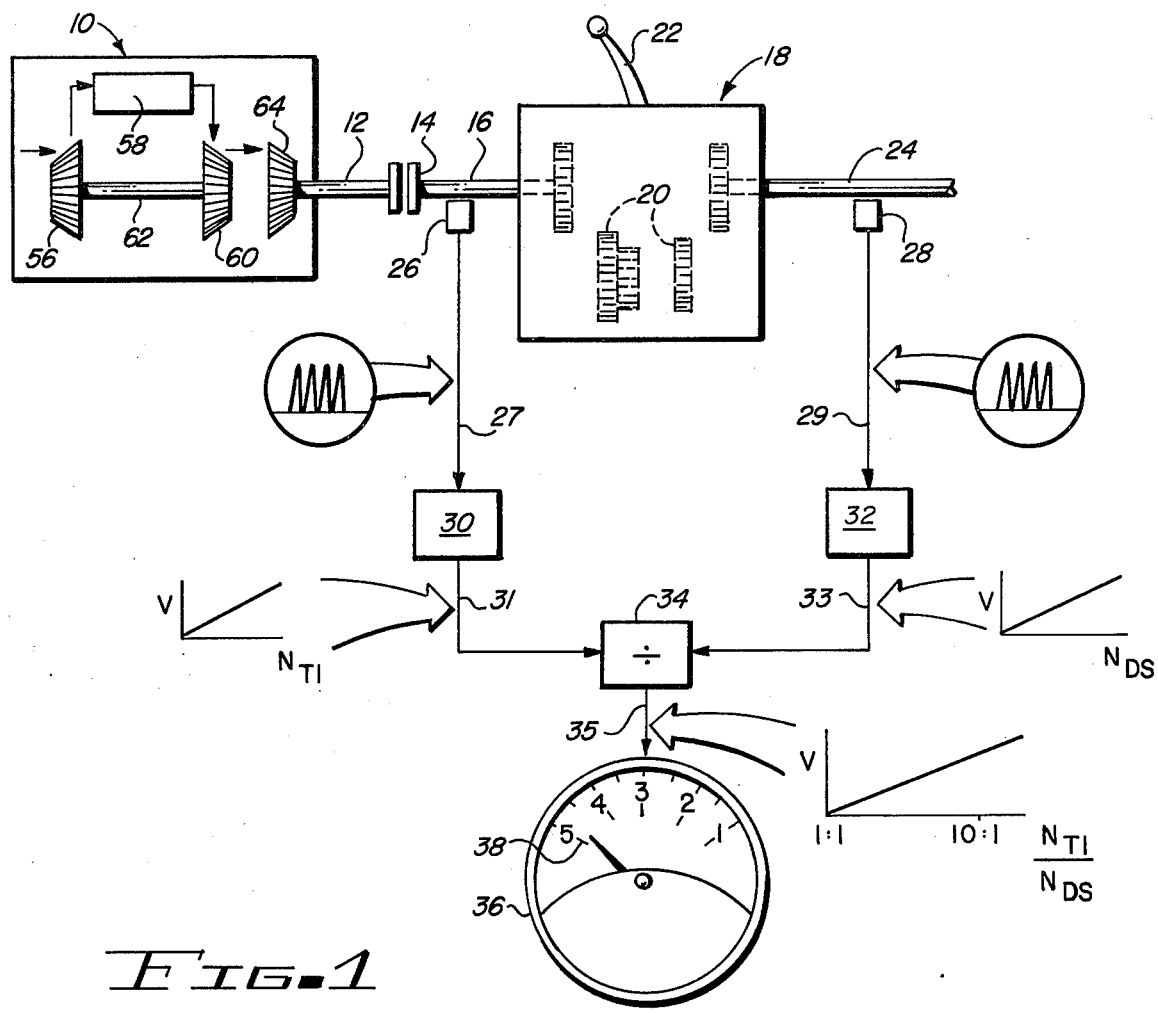
FIG. 1 is a schematic representation of one form of the invention.

Refering now more particularly to FIG. 1, one form of the invention is illustrated in conjunction with a free turbine type gas turbine 10 as the power source for a ground driven vehicle. The type of engine 10 illustrated is for exemplary purposes only, it being noted that the present invention is useful with a variety of prime movers including Diesel or Otto cycle engines, or any other type of prime mover. In conjunction with a free turbine type gas turbine engine for driving a ground vehicle such as a heavy-duty truck, however, the present invention is yet further advantageous. In this respect, the free turbine type engine includes a gas generator section including a compressor 56 delivering a pressurized airflow to a continuous combustor 58, with heated exhaust gas flow from the combustor passing across a first turbine or set of turbines 60 interconnected to shaft 62 to drive compressor 56. The free turbine engine further includes a free turbine or power turbine section 64 which receives gas exhausted across turbine 60 and is thus driven and connected with the gas generator section only by the motive gas flow therefrom. An output shaft 12 from the free turbine 64 presents the output drive shaft for the vehicle drive train. During operation of such a free turbine engine 10, the gas generator section remains at relatively high speed and, since it is not mechanically connected with the output drive shaft 12, the relatively quiet, characteristic noise generated by the engine is a function of the gas generator section speed which therefore can only with great difficulty provide the operator with some information with respect to the drive shaft speed 12. This is particularly true during gear shifting operations. Thus, while a free turbine engine 10 offers a distinct advantage in that the transmission required needs only a few (three or so) different gear ratios, it is more difficult to smoothly shift gears in a non-synchronized transmission with this type engine.

The engine drive train further includes a manually operated clutch 14 which is engagable and disengagable to selectively interconnect the engine drive shaft 12 with a transmission input shaft 16 of a non-synchronous, multispeed, manually operated, "crash box" type of transmission 18. Transmission 18 includes in a conventional manner a plurality of gears 20 therewithin so as to provide a plurality of selectively available gear ratios for interconnecting the transmission input shaft 16 with the transmission output shaft 24. Transmission output shaft 24 conventionally forms a part of the final drive leading to the ground vehicle drive wheels. Transmission 18 further includes a manual gear shift lever 22 shiftable to a variety of preselected positions to select any one of the various gear ratios available.

Electrical pickups in the form of monopole speed sensors 26, 28 are associated with the transmission input shaft 16 and output shaft 24, on gears directly driven thereby, to produce output signals in lines 27 and 29 which are a series of pulses, or pulse trains whose frequencies are indicative of the respective input and output shaft speeds. The input shaft speed signal in line 27, $N_{ti}$, is processed through a signal conditioner 30 in FIG. 1 which is a frequency to analog converter to develop an output signal in line 31 which is a voltage whose magnitude is indicative of $N_{ti}$. Similarly, the transmission output shaft speed, $N_{ds}$, is processed by another frequency to analog converter 32 to develop another voltage signal in line 33 whose magnitude is indicative of $N_{ds}$. The signals in lines 31 and 33 are inputs to an electrical divider 34 which may be a conventional electrical multiplier so that the output signal from divider 34 is an analog voltage signal whose magnitude is indicative of the ratio $N_{ti}/N_{ds}$. Accordingly, the analog voltage signal of line 35 is a continuous signal always indicative of the ratio of the actual speed of shaft 16 compared to the actual speed of shaft 24.

The analog voltage signal 35 is delivered to a numerical readout device 36 which has indicia 38 thereon in the form of numbers that are representative of the actual gear ratios which may be selected with transmission 18. For instance, the numeral 1 on readout 36 correspond to gear ratio for "first gear". Similarly, the remaining whole numbers 2, 3, 4 . . . through the top gear available, are also representative of the different gear ratios available.

Accordingly, the signal 35 drives the indicator of readout 36 to a location corresponding with the actual or determined gear ratio of the transmission. Simply by glancing at the indicator 36, the vehicle operator will therefore be able to know the actual transmission running speed ratio, $N_{ti}/N_{ds}$, in direct comparison to the different gear ratios which he has available to select. Thus, when the indicator is between numbers "4" and "5", he immediately known that his transmission speeds are incorrect for shifting, and also knows how to vary the transmission input speed and/or output speed in order to move the indicator closer towards the whole number "5". Once the indicator is at the whole number "5" he can operate gear shifter 22 to engage "fifth gear".

Figure 2:
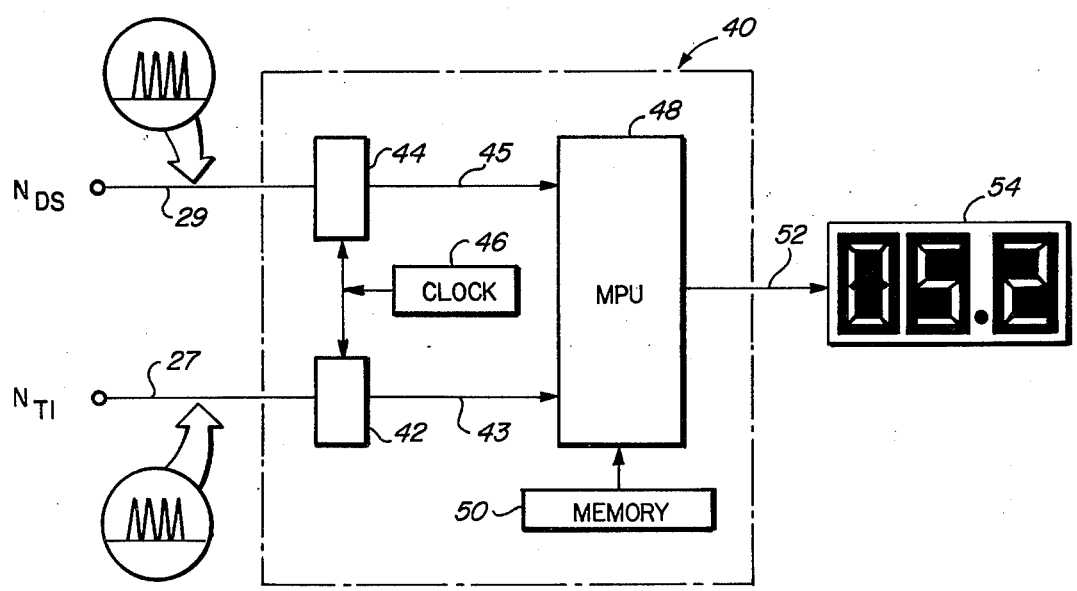
FIG. 2 is a schematic illustrating a modified form of the invention.

FIG. 2 illustrates a modified form of the invention wherein the two pulse train signals in lines 27 and 29 are delivered to a digital micro-processor unit 40 which may be in the form of a single micro-processor. Preferably the micro-processor is an integrated unit generating and performing all necessary calculations in order to generate an output signal in line 52 which is displayed on a digital readout 54. Simply for purposes of explanation the micro-processor unit 40 is illustrated with internal functional boxes 42, 44, 46, 48 and 50. For instance, the two pulse train signals in lines 27, 29 are delivered to counters 42, 44 driven by a clock 46 which operate to develop output signals 43 and 45 that are digital numbers representative of the respective input and output shaft speeds. These digital signals are in the form of counts or revolutions per unit time. Thus being transformed into a digital signal, this information is fed to a micro-processor 48 which also receives input from a stored memory 50 that contains information regarding the actual gear ratios available within transmission 18. Properly scaling the input signals, dividing them, determining the actual running ratio of the transmission, then comparing it to the available gear ratios from the memory 50, the micro-processor 48 develops an output signal which is indicative of the actual ratio $N_{ti}/N_{ds}$, but in terms of the various gear ratios available. Again, the digital readout shows a whole number, 1, 2, 3 . . . through the highest gear ratio available, whenever the actual running speed ratio $N_{ti}/N_{ds}$ equals different ones of the gear ratios available. Also, the decimal or fractional numbers such as the "05.2" illustrated informs the vehicle operator that he cannot smoothly shift to "fifth gear" at the present moment, and also tells him that he must slightly reduce the speed of input shaft 16 or increase vehicle ground speed as reflected by output shaft 24, all in order to smoothly shift into "fifth gear".

Various alterations and modifications to the foregoing detailed description of preferred forms of the invention will be apparent to those skilled in the art. For instance, while the illustrated readout devices 36 and 54 are in the form of visual displays, any other type of operator understandable language may be utilized. Thus audible communication such as noise signals or any other form of human readable language can be utilized. Further, while in the preferred form an electrical system as illustrated in FIGS. 1 or 2 is preferred other equivalent systems could also be utilized. Similarly, the digital readout 54 illustrated in FIG. 2 could be substituted directly for the analog readout 36 of FIG. 1 if desired. It will also be apparent that the improved method and apparatus of the present invention is not necessarily limited to use in association with ground vehicles but may have a varied application where such type of non-synchronous, manually shifted transmission is utilized. Accordingly, the foregoing should be considered exemplary in nature and not as limiting to the scope and spirit of the invention as set forth in the appended claims.

From the foregoing it will be apparent that the present invention contemplates an improved method of displaying information which is useful in assisting the operator to change gear ratios in a manually operated, shiftable gear, non-synchronous type transmission which has a plurality of selectively available gear ratios. The improved method includes the sensing of the input and output shafts 16 and 24, determining the ratio of the sensed speeds, and then displaying this determined ratio in indicia which are indicative of the selectively available gear ratios. This also includes the scaling of the determined, actual ratio of the sensed speeds in relation to the selectively available gear ratios. Preferably the determined gear ratio is continuously displayed as numerical readout with whole numbers sequentially corresponding to different ones of the selectively available gear ratios, the display being either analog or digital in nature, with fractional or decimal number readouts representing that the actual transmission speed ratio is intermediate in valu to the available gear ratios.

Having described the invention with sufficient clarity than those skilled in the art may make and use it, what is claimed as new and desired to be secured by Letters Patent is:

1. A method of displaying information useful in changing gear ratios in a manually operated, shiftable gear transmission having a plurality of selectively available gear ratios, comprising the steps of: sensing the speeds of the input and output shafts of the transmission, determining the ratio of said sensed speeds, and displaying the determined ratio in indicia indicative of said selectively available gear ratios.

2. A method as set forth in claim 1, further including the step of scaling said determined ratio in relation to said selectively available gear ratios.

3. A method as set forth in claim 1, wherein said displaying step includes continuously displaying said determined ratio as a numerical readout, said readout being preselected whereby said indicia comprise whole numbers sequentially corresponding to said selectively available gear ratios.

4. A method as set forth in claim 3, wherein said displaying step includes displaying said numerical readout on an analog dial having said indicia therein.

5. A method as set forth in claim 3, wherein said displaying step includes displaying said numerical readout as a digital readout with fractional number readouts representing that said determined ratio is intermediate in value to said available gear ratios.

6. A method of displaying information useful in changing gear ratios in a manually operated, shiftable gear transmission having a plurality of selectively available gear ratios, comprising the steps of: sensing the speeds of the input and output shafts of the transmission, determining the ratio of said sensed speeds, and scaling the determined ratio in relation to said selectively available gear ratios.

7. A method as set forth in claims 1, 6, 4 or 5 wherein said sensing step includes electrically sensing said speeds and generating electrical speed signals including frequency pulse trains corresponding thereto.

8. A method as set forth in claim 7, wherein said determining step includes electrically dividing said speed signals.

9. For use with a manually operated, shiftable gear transmission having a plurality of selectively available gear ratios for interconnecting input and output shafts of said transmission:
   sensing means for sensing the speeds of said input and output shafts;
   calculating means for determining the ratio of said sensed input shaft speed to said sensed output shaft speed; and
   display means operably associated with said calculating means and having preselected indicia indicative of said selectively available gear ratios, said display means operable to display said determined ratio in terms of said preselected indicia.

10. In a vehicle:
   an engine having an output drive shaft;
   a manual, shiftable gear transmission having input and output shafts and a gear train presenting a plurality of selectable gear ratios for interconnecting said input and output shafts;
   a manual clutch interposed between said drive shaft and said transmission input shaft;
   a gear ratio selector coupled with said transmission and shiftable to a plurality of different positions to select different ones of said transmission gear ratios;
   sensing means for sensing the speeds of said input and output shafts;
   calculating means for determining the ratio of said sensed input shaft speed to said sensed output shaft speed; and
   display means operably associated with said calculating means and having preselected indicia indicative of said selectively available gear ratios, said display means operable to display said determined ratio in terms of said preselected indicia.

11. In a ground vehicle driven by a free turbine type gas turbine engine having an output drive shaft:
   a manual, shiftable gear transmission having input and output shafts and a gear train presenting a plurality of selectable gear ratios for interconnecting said input and output shafts;
   a manual clutch interposed between said drive shaft and said transmission input shaft;
   a gear ratio selector coupled with said transmission and shiftable to a plurality of different positions to select different ones of said transmission gear ratios;
   sensing means for sensing the speeds of said input and output shafts;
   calculating means for determining the ratio of said sensed input shaft speed to said sensed output shaft speed; and
   display means operably associated with said calculating means and having preselected indicia indicative of said selectively available gear ratios, said display means operable to display said determined ratio in terms of said preselected indicia.

12. A free turbine type gas turbine engine, comprising:
   a gas generator section developing a flow of motive gas;
   a free turbine section driven by said motive gas flow to rotate a drive shaft;

a manual, shiftable gear transmission having input and output shaft and a gear train presenting a plurality of selectable gear ratios for interconnecting said input and output shafts;

a manual clutch interposed between said drive shaft and said transmission input shaft;

a gear ratio selector coupled with said transmission and shiftable to a plurality of different positions to select different ones of said transmission gear ratios;

sensing means for sensing the speeds of said input and output shafts;

calculating means for determining the ratio of said sensed input shaft speed to said sensed output shaft speed; and display means operably associated with said calculating means and having preselected indicia indicative of said selectively available gear ratios, said display means operable to display said determined ratio in terms of said preselected indicia.

13. A power transmission, comprising:

a manual, change speed type gear box having power input and output shafts and a gear train presenting a plurality of selectable gear ratios for interconnecting said input and output shafts;

a gear ratio selector coupled with said transmission and shiftable to a plurality of different positions to select different ones of said transmission gear ratios;

sensing means for sensing the speeds of said input and output shafts;

calculating means for determining the ratio of said sensed input shaft speed to said sensed output shaft speed, and display means operably associated with said calculating means and having preselected indicia indicative of said selectively available gear ratios, said display means operable to display said determined ratio in terms of said preselected indicia.

14. For use with a power train driving a ground vehicle, said power train including a drive shaft, a non-synchronous, manual, multispeed transmission with input and output shafts and a plurality of selectable gear ratios for interconnecting the input and output shafts, and a manual clutch interposed between said drive shaft and said input shaft; a device for assisting the vehicle operator in shifting between said available gear ratios, comprising:

sensing means for sensing the speeds of said input and output shafts;

calculating means for determining the ratio of said sensed input shaft speed to said sensed output shaft speed; and display means operably associated with said calculating means and having preselected indicia indicative of said selectively available gear ratios, said display means operable to display said determined ratio in terms of said preselected indicia.

15. The invention of claims 9, 10, 11, 12, 13 or 14, wherein said sensing means comprise monopole electrical speed sensors generating speed signals including pulse trains whose frequencies are indicative of said speeds.

16. The invention of claim 15, wherein said calculating means includes means for electrically dividing said speed signals to generate a continuous electrical ratio signal indicative of said determined ratio.

17. The invention of claim 16, wherein said display means includes an analog readout having numerical indicia thereon corresponding to said selectively available gear ratios.

18. The invention of claim 16, wherein said calculationg means further includes means for comparing said determined ratio to said selectively available gear ratios and for developing an electrical output signal indicative of said determined ratio and scaled in terms of said available gear ratios.

19. The invention of claim 18, wherein said display means includes a digital readout, whereby said output signal is displayed in whole and fractional numbers with said whole numbers being indicative of when said determined ratio is equal to different ones of said selectively available gear ratios.

20. The invention of claim 19, wherein said calculating means includes electrical counter means for converting said pulse train to corresponding digital signals representative of said sensed speeds.

21. The invention of claim 17, wherein said calculating means includes frequency to analog converters for converting said pulse trains to analog voltage signals.

* * * * *